United States Patent

[11] 3,578,336

[72] Inventor Itsuki Ban
829, Higashi-Oizumimachi, Nerima-ku, Tokyo-to, Japan

[21] Appl. No. 720,848
[22] Filed Apr. 12, 1968
[45] Patented May 11, 1971
[32] Priority Apr. 14, 1967, Apr. 14, 1967
[33] Japan
[31] 42/23425 and 42/23428

[54] AUTOMATIC PLAYING APPARATUS UTILIZING PLURALITY OF ENDLESS TAPE CARTRIDGES
5 Claims, 10 Drawing Figs.

[52] U.S. Cl. .......... 274/4, 179/100.2, 242/55.19
[51] Int. Cl. .......... G11b 5/54, G11b 15/28, B65h 19/06
[50] Field of Search .......... 242/55.19, 198, 199, 200; 226/177, 178; 179/100.2; 352/78, 8, 123; 274/4

[56] References Cited

UNITED STATES PATENTS 3,001,025 9/1961 Gaubert .......... 179/100.2
2,821,576 1/1958 Gaubert .......... 179/100.2
2,781,689 2/1957 Heyer .......... 242/55.19

*Primary Examiner*—J. Russell Goudeau
*Attorney*—Nathan M. Briskin

ABSTRACT: An automatic playing apparatus utilizing a plurality of endless tape cartridges, comprising a movable housing within which a plurality of endless tape cartridges are arranged in a manner that each of them is inclined to a radius drawn from the center of rotation of the housing thereof, means for arresting movement of the housing to bring a preselected endless tape cartridge into the play position, a swingable deck including a magnetic head and a capstan adapted to abut against the endless tape and a pinch roller in the cartridge, respectively, when the cartridge is in the play position, whereby said deck is swung away from the selected cartridge when reproduction of the endless tape within the cartridge is completed, and a capstan into abutment with a pinch roller or out of abutment therewith is effected, movement of the housing is admitted when the pinch roller is away from the capstan to bring a next preselected cartridge into the play position and to change over a sound track when desired.

Patented May 11, 1971

3,578,336

3 Sheets-Sheet 1

INVENTOR

ITSUKI BAN

BY

ATTORNEY

INVENTOR
ITSUKI BAN
BY
ATTORNEY

INVENTOR
ITSUKI BAN
BY
[signature]
ATTORNEY

AUTOMATIC PLAYING APPARATUS UTILIZING PLURALITY OF ENDLESS TAPE CARTRIDGES

BACKGROUND OF THE INVENTION

The present invention relates to an automatic playing apparatus utilizing a plurality of endless tape cartridges and more specifically to a jukeboxlike playing apparatus wherein a plurality of endless tape cartridges are so arranged that each of them is inclined to the corresponding radius direction of the housing to allow the cartridge to be automatically played in a sequential manner.

Much of the currently available cartridge generally comprises an endless magnetic tape wound therewithin, a guide leading the tape along with the front edge of the cartridge and a pinch roller for feeding the tape in cooperation with a capstan. Various automatic playing apparatus have been proposed to automatically play the tape within one cartridge out of a plurality of cartridges.

For example, there is such an automatic playing apparatus wherein a plurality of endless tape cartridges are radially arranged within a movable ring-shaped housing, one cartridge out of the cartridges is brought into a preselected play position by movement of the housing, a deck provided with a capstan and a magnetic head is swung toward the cartridge in the play position to bring a pinch roller of the cartridge into abutment with a capstan and to feed the tape for desired reproduction so that a cycle of the tape is completed to bring an end mark on the tape into the front edge of the cartridge and the end mark is searched by an end mark detecting member to retract the deck from the cartridge and to terminate the tape feed whereby a reproduction of the tape within the cartridge in the play position is completed to allow the casing to be rotated again for bringing a next cartridge into the play position. According to this automatic playing apparatus, it is obvious that since the front edge of the cartridge projects from housing, the deck is required to be swingable to allow the capstan to be away from the cartridge at a distance more than the radius of the flywheel of the capstan when rotation of the housing is effected in order not to abut the front edge of the cartridge against the flywheel. With this arrangement, much energy is required to swing the deck and it is not possible to use a small stroke plunger as the driving means for the deck. For this reason, the apparatus involves a construction and arrangement of parts making it bulky, so that application of the apparatus is limited.

Means has been provided so that the flywheel may be positioned away from the range of movement of the cartridge by use of a longer capstan in order to minimize the swing of the deck. However, such means requires the capstan to be considerably longer so that the accuracy of capstan is deteriorated with the tone quality being reduced. These defects are aggravated if the number of cartridges and the diameter of the housing are increased. This disadvantage is derived from that the cartridges are radially and diametrically arranged within the casing.

This invention contemplates that an improved automatic playing apparatus is provided so that all the defects are eliminated and various requirements necessary for an automatic playing apparatus storing a plurality of cartridges, are satisfied. These requirements are such that, first, the cartridge and the sound track are indexed or preselected as programmed, second, the tape is automatically played in a sequential manner as programmed, third, recorded matter is readily recognized, fourth, a compact, less expensive and light apparatus wherein the use of deflective parts is avoided.

SUMMARY OF THE INVENTION

A principal object of the present invention is to provide an automatic playing apparatus utilizing a plurality of endless tape cartridges wherein these cartridges are arranged within the housing in a manner such that each of them is inclined to a radius drawn from the center of rotation of the housing and passing through the cartridge, the cartridge and the sound track is selected by depressing a plurality of pushrods provided on the housing, and the cartridge is brought into the play position by bringing the depressed pushrod into abutment with a stop member on the cabinet for effecting tape reproduction.

Another object of the invention is to provide an automatic playing apparatus utilizing a plurality of endless tape cartridges wherein with the inclined arrangement of a plurality of endless tape cartridges, a flywheel mounted on the capstan does not come within the range of movement of the cartridge's front edge which projects from the periphery of the housing.

Still another object of the invention is to provide an automatic playing apparatus utilizing a plurality of endless tape cartridges, which is adapted to effect the play and stop of the tape by swingable movement of a deck comprising a capstan and magnetic head.

Further object of the invention is to provide an automatic playing apparatus wherein a deck is moved away from the cartridge by detecting an end mark on the tape and releasing the housing from engagement thereof in response to such direction, and to move the housing while the deck is away from the cartridge until a next preselected cartridge is brought into the play position and thereafter the deck is automatically returned for effecting the tape reproduction in the play position.

Still further object of the invention is to provide an automatic playing apparatus which is provided with each of the cartridges bearing a label at the lid thereof so that recorded matter is easily recognized.

With the foregoing and other objects in view, the invention will be more fully described hereinafter, and will be more particularly pointed out in the claims appended hereto.

In the drawings, wherein like numerals refer to like or corresponding parts throughout the several views:

DESCRIPTION OF THE PREFERRED EMBODIMENTS

Figures 1, 2:
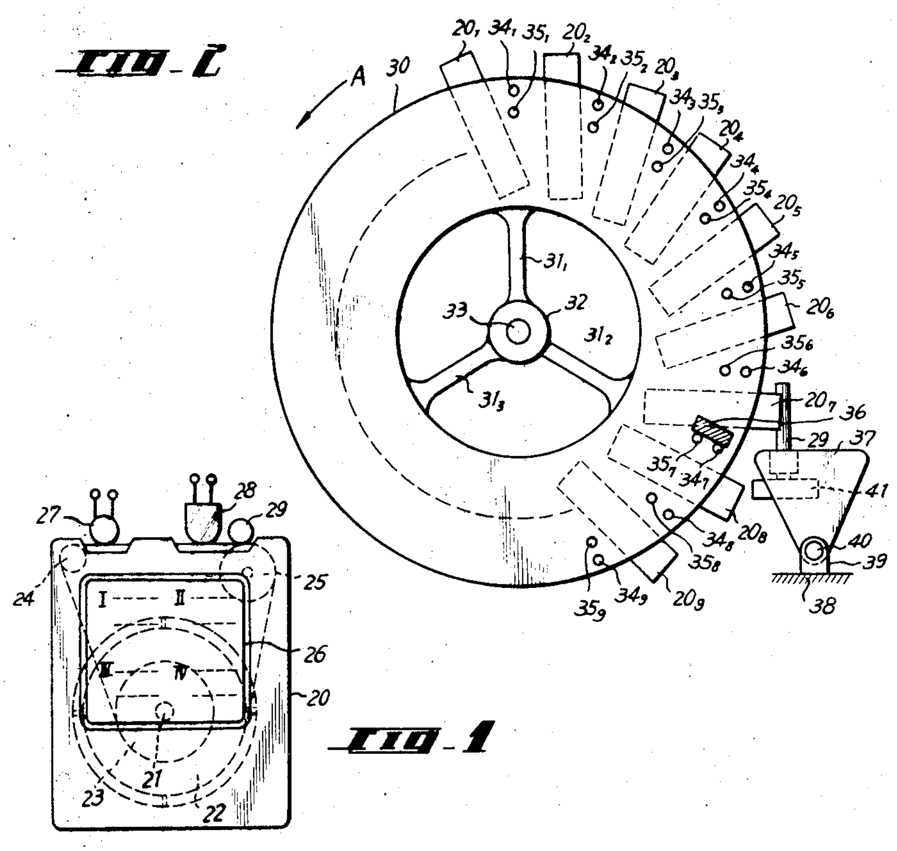
FIG. 1 is a top plan view of one example of an endless tape cartridge.
FIG. 2 is a plan view of one embodiment of a playing apparatus according to the present invention showing a housing receiving the endless tape cartridges and a deck carrying a capstan.

In the one form of the endless tape cartridge as shown in FIG. 1, a rotatable base 23 with an endless tape 22 wound thereon is supported by a shaft 21 secured to the bottom of the cartridge 20. A portion of tape 22 is drawn out to the front edge of cartridge 20 through a tape guide 24 and a pinch roller 25. Upon the lid of cartridge 20 is affixed a label 26 indicating of a plurality of sound tracks numbered I, II, III,—with indications of corresponding recorded contents respectively. In contact with the tape 22 adjacent the front edge of cartridge 20 are an end mark detecting head 27 for searching an end mark (not shown) of the tape and a magnetic head 28. The tape 22 is driven through a pinch roller 25 and a capstan 29 which are in pressure contact with each other with tape 22 therebetween.

FIG. 2 shows one embodiment of the present invention utilizing a plurality of cartridges of above-mentioned structure. A ring-shaped housing 30 is provided and, through supporting arms $31_1$, $31_2$, and $31_3$, the central bearing 32 is supported by a shaft 33 fixed to the cabinet. The housing 30 is driven by a spring motor (not shown) or an electromotor (not shown) and swings about the shaft 33 in the direction of arrow A. A plurality of cartridges $20_1$, $20_2$, $20_3$, ..... are releasably arranged in the housing 30, as shown in the drawing. Each of these cartridges is so arranged as to be inclined to the relevant radius direction of the housing 30 and the front edge thereof projects out of the periphery of the housing 30. Thus, the housing 30 is provided with a plurality of openings for insertion of corresponding plurality of cartridges. Although only nine cartridges are shown in the drawing, the cartridges are likewise arranged in the portion indicated with dotted lines. Corresponding respectively to the cartridges $20_1$, $20_2$, $20_3$, ..... there are provided pushrods or pushbutton rods ($34_1$, $35_1$), ($34_2$, $35_2$), ($34_3$, $35_3$), ..... which are so arranged with their respective upper end portions projecting over the upper surface of the housing 30 that when these portions are depressed the respective lower portions will project down from the surface of the housing 30. These pushrods are adapted for selection of a cartridge and sound track. In the drawing is shown a state wherein the pushrods $34_7$, $35_7$, are depressed and two sound tracks of the cartridge $20_7$ are selected. The lower ends of the pushrods $34_7$, $35_7$ projecting from the lower surface of the housing 30 abut against a stop member 36 arranged on the cabinet so that the movement of the housing 30 is arrested and the cartridge $20_7$ is placed in the play position. Adjacent the front edge portion of the cartridge $20_7$ in the play position is arranged a deck 37 which carries an end mark detecting head 27, magnetic head 28, capstan 29, and etc., The deck 37 is swingably arranged with its shaft 40 supported by a bearing 39 arranged to the cabinet 38. In the drawing, the deck 37 has been swung counterclockwise so that the capstan 29 is in pressure contact with the pinch roller of the cartridge $20_7$ and the tape is driven to perform sound reproduction. When the tape end mark is detected by the end mark detecting head, the deck 37 is swung clockwise and is away from the front edge of the cartridge $20_7$. The detail of deck driving means will be described later.

When the deck 37 is swung, as described in detail later, the pushrods $34_7$, $35_7$ engaging the stop member 36 are returned, the housing 30 is released and stops again at such point that the next depressed pushbutton rod engages the stop member 36 so that the cartridge corresponding to this pushrod is brought to the play position and sound reproduction is carried out. A flywheel 41 is attached to the capstan 29.

In the playing apparatus as shown in FIG. 2, the cartridges $20_1$, $20_2$, $20_3$..... are so arranged that each of them is inclined to the corresponding radius of the housing 30 passing through the cartridge, so that, as is clear from the drawing, when the swing of the deck 37 is of a small amount, the flywheel 41 of the capstan 29 does not prevent the housing 30 from its movement. This is advantageous but, on the other hand, it is accompanied by a disadvantage that the label 26 on the lid surface of the cartridge 20 cannot be seen.

Figure 3:
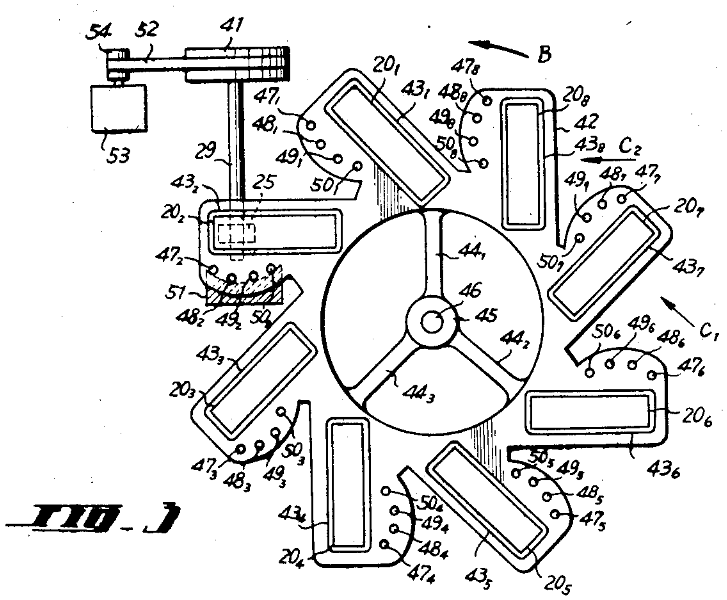
FIGS. 3, 4, and 5 are top plan views of other embodiments respectively of the playing apparatus of the present invention.
Figures 4, 5, 6:
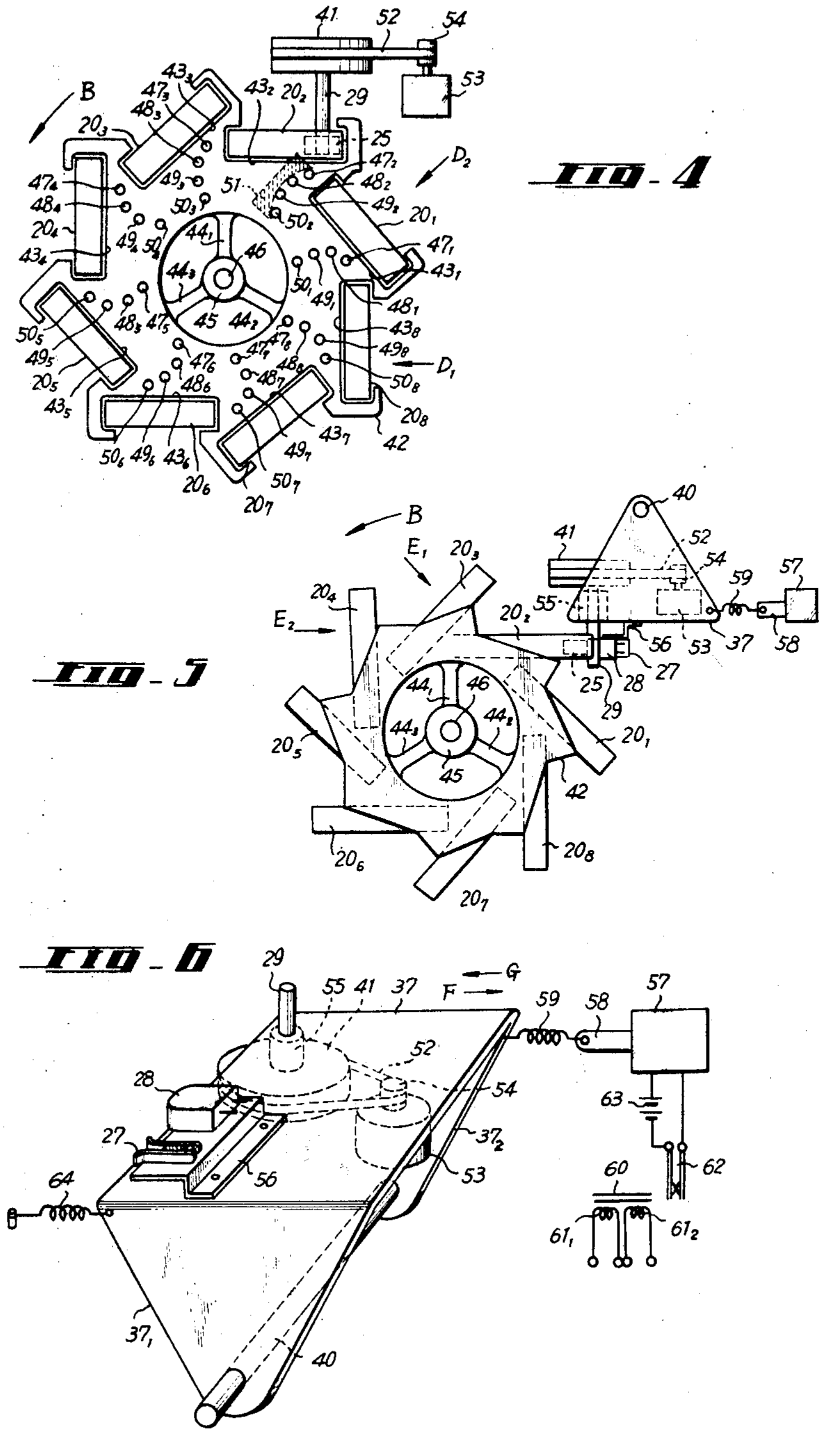
FIG. 6 is a perspective view of the deck arrangement in the playing apparatus as shown in FIGS. 2 to 5.

In the embodiment as shown in FIGS. 3 to 5 such disadvantage is avoided and the user can readily know the recorded matter of the tape held in the cartridge. In FIGS. 3 to 5 like numeral is used for parts of same function.

In FIG. 3, a housing 42 is provided with openings $43_1$, $43_2$, ..... $43_8$ for insertion of the cartridges with their front edges directed downward, and is rotatably supported by a shaft 46 secured to the cabinet through supporting arms $44_1$, $44_2$ and $44_3$ and bearing 45. In the insert openings $43_1$, $43_2$, .... $43_8$ there is provided a stop arrangement (not shown) to resiliently urge the peripheries of the inserted cartridges $20_1$, $20_2$, .... $20_8$ so that the cartridges may not be slidingly moved to the insert openings unless they are manually moved. On the lower surface of the housing 42 there is provided an engaging portion (not shown) to engage slightly projecting front edges of the cartridges $20_1$, $20_2$, .... $20_8$ inserted in the insert openings $43_1$, $43_2$, ..... $43_8$, thereby limiting the extent of cartridge insertion. The rear end of the cartridge held in the housing 42 slightly projects from the upper surface of the housing so that the user can hold this rear end and pull out the cartridge.

Like the above mentioned embodiment, through the driving force of a spring motor or an electromotor, the housing 42 may be swung in the direction of arrow B about the shaft 46. The housing 42 is provided, corresponding respectively to the cartridges held therein, pushrods ($47_1$, $48_1$, $49_1$, $50_1$), ($47_2$, $48_2$, $49_2$, $50_2$), ..... ($47_8$, $48_8$, $49_8$, $50_8$) which, when depressed, moves down and is frictionally engaged. For example, when pushrods $47_2$, $48_2$, $50_2$corresponding to the cartridge $20_2$ are pushed down, the pushbutton rod swings together with the housing 42 and abuts against a stop member 51 arranged on the cabinet so that the movement is arrested and the cartridge $20_2$ is brought to the play position. Although the lower end of the pushed down pushrod abuts against the stop member 51, the front edge of each cartridge slightly projecting from the lower surface of the housing 42 does not come into abutment.

As in the aforementioned example, the cartridge $20_2$ in the play position is opposed to a capstan 29 carried by the deck. A flywheel 41 attached to the capstan 29 is coupled through a belt 52 to a rotating shaft 54 of an electromotor 53 carried by the deck. Since in the playing apparatus of FIG. 3 the cartridges are arranged with greater inclination to the corresponding radius, the user can know the recorded matter by viewing the label on the lid surface of the cartridge in the directions of arrow $C_1$ and $C_2$. Of course the viewing portion facing the lid surface of the cartridge may be formed with transparent material or into an window. With such cartridge arrangement there is obtained a space for arrangement of the flywheel 41 so that relatively short capstan 29 can be used, resulting in readier manufacture and improvement in tone quality.

The extent of the swing of the deck carrying the capstan, the magnetic head, etc., can be very small. It is necessary, however, that the deck be withdrawn from the cartridge to such extent that the lower end of the depressed pushrod is not in abutment with the capstan or the magnetic head.

In the embodiment as shown in FIG. 4, the cartridge is further inclined to the radius direction of the housing, the angle of inclination being approximately 90°. Therefore, viewing of the label on the cartridge can be more readily carried out in the directions of arrow $D_1$, $D_2$ ..... and the length of the capstan 29 can be further shortened. In FIG. 4, the like numerals as those in FIG. 3 are used for corresponding parts.

In FIG. 5, the inclination angle between the housing radius direction and the cartridge is approximately the same as that of FIG. 3, and, as in the case of FIG. 2, the cartridges are arranged with their front edges positioned at the peripheral surfaces of the housing 42. Accordingly, the deck is also arranged adjacent the peripheral surface of the housing 42. With such cartridge arrangement, the housing and the deck are naturally not in vertical arrangement as in FIGS. 3 and 4 but in side-by-side arrangement which advantageously lead to a flat configuration of the entire arrangement. The cartridges and the sound track selecting pushrods are of course provided but these are not shown in the drawing. According to the embodiment of FIG. 5, the lid surface of each of the cartridges $20_1$, $20_2$, ..... $20_8$ is exposed out of the housing so that the label can be completely viewed in the directions of arrows $E_1$, $E_2$ ..... .

In FIGS. 5 and 6 the deck arrangement is shown in detail with one portion thereof shown schematically. In those drawings, a bearing 55 is fixed to the deck 37 and rotatably supports the capstan 29. A mount base 56 carries the end mark detecting head 27 and the magnetic head 28. An electromagnetic plunger 57 for driving the deck 37, and an actuator 58 is coupled through a spring 59 to a portion of the deck 37. The like numerals as those in FIG. 2 indicate the like parts.

FIG. 6 shows the deck arrangement of FIG. 5 in greater detail. The deck 37 is supported by a swing shaft 40 with depending portions $37_1$ and $37_2$ engaging the same. An electromagnetic relay 60 has two windings $61_1$ and $61_2$. When the winding $61_1$ is energized the electromagnetic relay 60 is actuated to close a relay contact 62 and a power source 63 supplies current to an electromagnetic plunger 57. At this time, the electromagnetic relay 60 self-maintains by the action of a self-reserve relay (not shown), and the electromagnetic plunger 57 swings the deck 37 in the direction of arrow F through a spring 59 and against the action of a spring 64 and retains the same at this position. Accordingly, the capstan 29 is away from the pinch roller of the cartridge in the play position, and the magnetic head 28 and the end mark detecting head 27 are away from the tape so that the reproduction stopped. With the end mark detecting head 27 inserted in the power supply circuit of the winding $61_1$, the deck 37 withdraws from the cartridge and the reproduction is stopped every time one cartridge sound track reproduction is completed and the end mark is detected by said detecting head 27. If arrangement is so made that the winding $61_2$ in pulse-energized after selection of the next cartridge or sound track is completed, since the magnetic fluxes generated by the windings $61_1$ and $62_2$ are opposed to each other, the self-reserved action of the electromagnetic relay 60 is eliminated and the relay contact 62 is opened. Accordingly, due to the action of the spring 64 the deck 37 is swung in the direction of arrow G, the capstan 29 is pressed on the pinch roller 25, the magnetic head 28 is brought in contact with the tape and the reproduction with respect to the selected sound track is started.

When arrangement is so made that the winding $61_2$ is removed and a capacitor of large capacitance and a resistor are connected in series with the self-reserved circuit of the windings $61_1$, after a lapse of predetermined time the electromagnetic relay 60 is automatically released from said self-reserved state so that the deck 37 is swung in the direction of arrow G to start the reproduction, thus eliminating a signal to be given to the winding $61_2$. It is necessary, however, that said predetermined time is at least longer that the time required for one full rotation of the housing 30 or 42. This is for carrying out selection of the next cartridge within this time. For driving means for causing the deck 37 to make such action, any known device other than that of this example may be employed, but it must satisfy the next condition. Due to the end mark signal at completion of reproduction the capstan is away from the cartridge, and due to a signal for selection of the next cartridge or sound track, or after the lapse of predetermined time, the capstan is automatically returned to contact the selected cartridge.

Now the sound track selection method for each cartridge will be described in detail in conjunction with FIGS. 7 to 10, wherein the same components as those shown in FIGS. 3 to 5 are denoted by the same numerals.

Figures 7, 8, 9, 10:
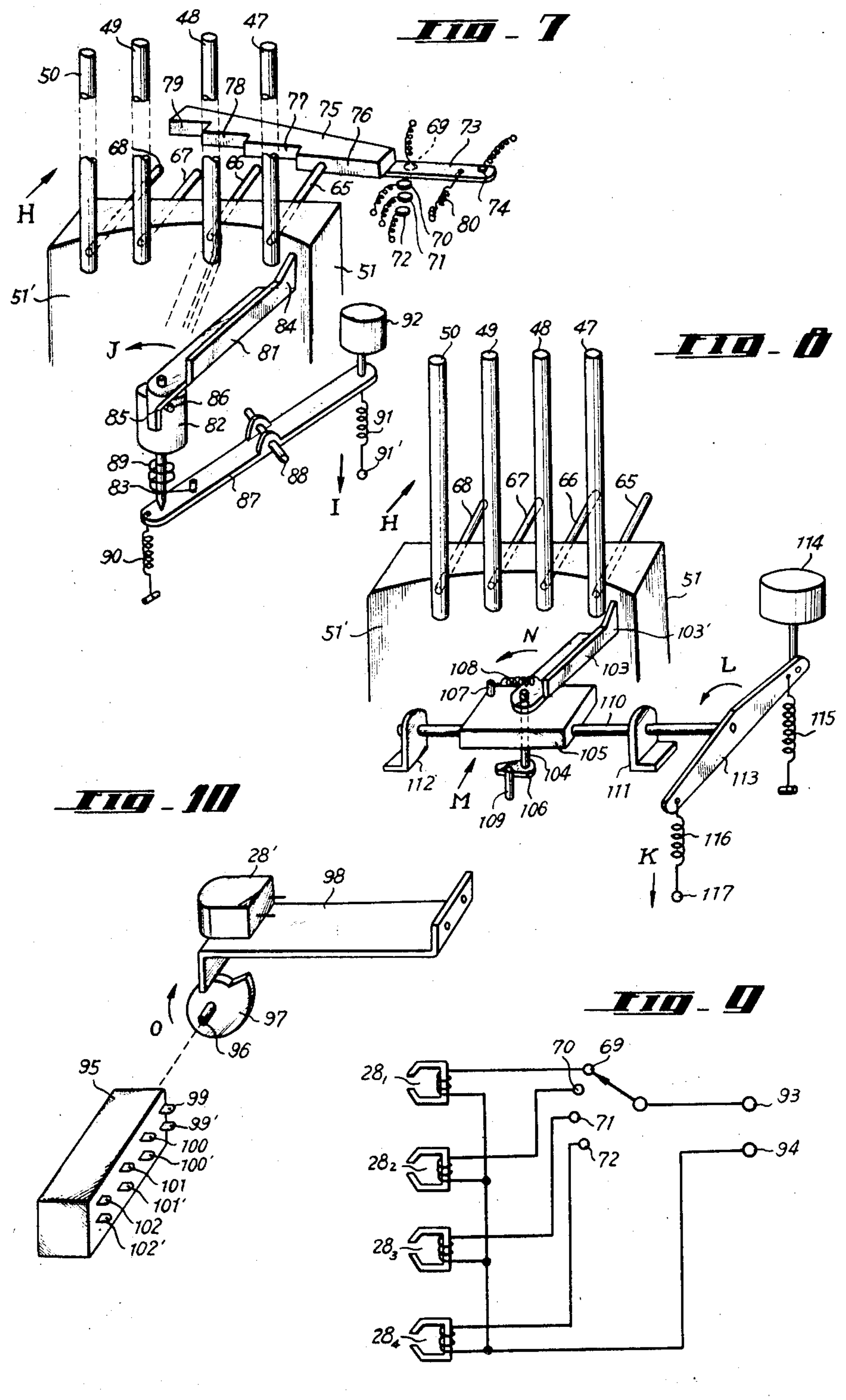
FIG. 7 is a perspective view of means adapted to select a sound track.
FIG. 8 is a perspective view of another embodiment of the present invention.
FIG. 9 is a circuit diagram of an arrangement wherein sound track changeover is carried out through circuit changeover operation.
FIG. 10 is a simplified perspective view of means wherein the changeover is effected through shifting of a magnetic head.

In FIG. 7, said stop member 51 has a curved surface 51'. Push rods 47, 48, 49 and 50, which are so provided as to be slidable and frictional-engageable therein, are arranged in a curved row corresponding to the curvature of the surface 51'. Accordingly, the depressed pushrods 47, 48, 49 and 50 engages the stop member 51 simultaneously. Operating rods or operative rods 65, 66, 67 and 68, corresponding to said pushrods respectively, pass through the stop member 51, and, as is clear from the drawing, upon the swing of the depressed rods in the direction of arrow H together with rotation of the housing, are depressed at the fore ends thereof and the rear ends thereof project from the rear surface of the stop member 51 by approximately the same amounts.

At the same time, the pushrods engage the stop member and the housing is stopped. Number 69, 70, 71 and 72 constitute switches with a movable contact 73 pivoted at its one end to an insulating base plate (not shown) by a shaft 74. To the free end of the movable contact 73 is fixed a lever 75 having four steps 76, 77, 78 and 79 which are opposed to the rear ends of said operating rods 65, 66, 67 and 68 respectively. Between the movable contact 73 and said insulating plate (not shown) is arranged a spring 80 whose resiliency urges the movable contact 73 and the lever 75 toward the stop member 51. Accordingly, in the illustrated case, the lever 75 is resiliently urged by the spring 80 through the step 76 to the rear end of the operating rod 65. At this time, the other steps 77, 78 and 79 are separated from the operation rods 66, 67 and 68 respectively, and the movable contact 73 is in contact with the contact 69 only. A pushrod return lever 81, which is to engage the stop member 51 upon being depressed, is fixed at one end thereof to a shaft 83 which is slidably and rotatably supported by a bearing tube 82 mounted on the cabinet. One side edge portion of the return lever 81 is bent up with an engaging part 84 formed at the force end thereof. The rear end portion of the return lever 81 is bent down to form a projecting inclined surface 85 in parallel with the side surface of said bearing tube 82. A pin 86 is fixed to the upper part of the side surface of the bearing tube 82. The projecting incline surface 85 of said return lever 81 engages said pin 86 to control the swing of the return lever 81. A lever 87, pivoted at the middle portion thereof to a shaft 88 fixed to the cabinet, is provided with one end thereof positioned adjacent the lower end of the shaft 83 of said return lever 81. Between the lever 87 and the shaft 83 is provided a coil spring 89 urging the return lever 81 counterclockwise on the drawing and also urging the shaft 83 downwardly. Between the lever 87 and the cabinet is provided a spring 90 which normally urges the return lever 81 against the upper end of the bearing tube 82. A spring 91 is connected at one end 91' thereof to said deck carrying capstan and others and is pulled in the direction of arrow I upon swing of the deck away from the cartridge. The other end of the spring 91 is fixed to the end of the lever 87. An air piston brake 92 is connected to the lever 87 to prevent it from making an abrupt swing.

The aforementioned switch-constituting contacts 69, 70, 71 and 72 are connected, as shown for example in FIG. 9, to one side output leads of the magnetic head pickup coils $28_1$, $28_2$, $28_3$ and $28_4$ corresponding to the first, second, third and fourth sound tracks of the tape respectively, and the movable contact 73 is connected to the input terminal 93 of a reproduction amplifier (not shown). The other side output leads of the pickup coils $28_1$, $28_2$, $28_3$ and $28_4$ are commonly connected to the ground side input terminal 94 of the reproduction amplifier (not shown). Accordingly, when the movable contact 73 is in contact with each of the switch contacts 69, 70, 71 and 72, the reproduced signal from the corresponding sound track is applied via the input terminals 93 and 94 to the reproduction amplifier (not shown).

FIG. 9 shows an arrangement wherein sound track changeover is carried out through changeover of magnetic head pickup coil output.

In FIG. 10 there is shown an arrangement wherein sound track changeover is carried out through vertical movement of the magnetic head. A swing control arrangement 95 is provided containing a rotary solenoid. To the end of a swing shaft 96 is fixed an eccentric cam 97. Against the eccentric cam 97 is urged a leaf spring 98 which is fixed at one end thereof to a deck (not shown) and is provided with a magnetic head 28' fixed thereto.

When the terminals 99 and 99' of the swing control arrangement 95 are short-circuited, the eccentric cam 97 is stopped at the illustrated position and the magnetic head 28' is opposed to the first sound track. When the terminals 100 and 100' are short-circuited, the eccentric cam 97 swings 90°in the direction of arrow 0 and then stops so that the magnetic head 28' moves up to oppose the second sound track. Thus, upon short circuit of the terminals (101, 101') and (102, 102') the magnetic head 28' is brought in contact with the third and the fourth sound tracks respectively. Accordingly, if the terminals 99', 100', 101' and 102' are commonly connected to the movable contact 75 and the terminals 99, 100, 101 and 102 are connected to the contacts 69, 70, 71 and 72 respectively, it is clear that changeover of sound tracks can be carried out.

Referring again to FIG. 7, there is down the first sound track with respect to which reproduction is being made. When, upon completion of reproduction the deck is swung due to the end mark signal to withdraw from the cartridge at the play position, a force is abruptly applied to the spring 91 in the direction of arrow I to be extended and energized. As a result, under the action of the air piston brake 92 the lever 87 is slowly swung about the pivot 88 against the resiliency of the spring 90 and pushes up the shaft 83 and the return lever 81. Under the control of the projecting inclined surface 85 and the pin 86, the return lever 81 starts to swing in the direction of arrow J as it is moving up. When the engaging part 84 abuts against the lower end of the push rod 47, the swing of the return lever 81 is stopped. Further swing of the lever 87 causes, through the shaft 83, the return lever 81 to move up so that the return lever 81 pushes the lower end of the pushrod 47 and causes the same to move up to be disengaged from the stop member 51 and at the same time causes the pushrod 47 to be returned to the original position. Accordingly, the operating rod 65 returns due to pressure exerted thereon by the step 76 of the lever 75. At this time the step 77 of the lever 75 abuts against the operating rod 66, and the movable contact 73 is separated from the contact 69 and comes in contact with the contact 70. As a result, reproduction is now to be made with respect to the second sound track instead of the first sound track.

When the lever 87 returns due to return of the deck, the shaft 83 and the return lever 81 are also returned to their respective original positions under the action of the coil spring 89. It is necessary that the components are so related that, at this time, the return lever 81 is prevented from returning by the end of the operative rod 65 which has already returned. Upon swing of the deck due to the endmark signal at the completion of reproduction with respect to the second sound track, the return lever 81 is swung in the direction of arrow J as before, and directly abuts against the lower end of the pushbutton rod 48 as shown in dotted lines independent of the pushrod which has been already pushed up, and pushes up the pushrod 48, so that the operating rod 66 is returned, the lever 75 is swung and this time the step 78 is brought in abutment against the operating rod 67. At the same time, the movable contact 73 is separated from the contact 70 and brought in contact with the contact 71, thus selecting the third sound track.

When after repetition of above operations reproduction with respect to the last fourth sound track is completed, all the pushrods are pushed up and disengaged from the stop member 51, and the cartridge holding housing starts to move and moves until the next depressed pushrod is brought in engagement with the stop member 51. The above description relates to a case where all the four pushrods are depressed, that is, reproduction is to be made with respect to all the four sound tracks. It is clear, however, that reproduction can be made with respect also to any predetermined number of sound tracks by depressing corresponding number of pushrods. For a greater or smaller number of sound tracks of a tape held in one cartridge, the number of the pushbutton rods may be changed correspondingly. The embodiment in FIG. 2 shows a case where two sound tracks are provided.

The action of the projecting inclined surface 85 and the pin 86 for swinging the return lever 81 due to upward movement of the shaft 83 is an example of the methods and any method may be adapted. Another embodiment in FIG. 8, wherein a component of the same function as that in FIG. 7 is denoted by the same numeral. In the drawings there is shown the pushrods 47, 48, 49 and 50, which have moved together with the cartridge holding housing in the direction of arrow H, in engagement with the stop member 51. There is omitted a lever having steps to abut against the operating rods 65, 66, 67 and 68 respectively, but the corresponding arrangement is entirely the same as that of FIG. 7. The shaft 104 of the return lever 103 rotatably passes through the supporting member 105. A cam 106 is provided at the lower end of the shaft 104, and between the pin 107 secured to the supporting member 105 and the return lever 103 there is provided a spring 108 to urge the return lever 103 counterclockwise. The return lever 103 is prevented from swinging by abutment of the cam 106 secured to the shaft 104 against the pin 109 secured to the cabinet. The rotation shaft 110 of the support member 105 is supported by bearing parts 111 and 112 arranged to the cabinet, and to the right end thereof is fixed to a lever 113 whose end is provided with the air piston brake 214 which is similar to that shown in FIG. 7 and with the spring 215 fixed at the end thereof to the cabinet. To the other end of the lever 113 is secured a spring 116 whose other end 117 is secured to a part of the deck (not shown). When the deck withdraws from the cartridge in response to the tape end mark signal, the spring 216 is extended in the direction of arrow K and is energized. Due to the action of the air piston brake 214 the lever 113 slowly swings in the direction of arrow L against the resiliency of the spring 215 so that the cam 106 withdraws in the direction of arrow M. Accordingly, the return lever 103 is swung in the direction of arrow N due to the resiliency of the spring 108 and engaging part 103' abuts against the push rod 47. Further, upon swing of the lever 113 in the direction of arrow L, the return lever 103 abuts against the lower end of the push button rod 47 to push up and disengage the same from the stop member 51. The subsequent operation is the same as that described in connection with FIG. 7 so that it is clear that reproduction can be made with necessary successive changeover of the sound tracks.

While these has been made detailed description of the present invention in conjunction with the illustrated examples, it is to be understood that the apparatus according to the present invention is not limited to those examples and that various modifications and alterations can be made within the scope of the appended claims.

I claim:

1. An automatic playing apparatus utilizing a plurality of endless tape cartridges, comprising a housing mounted on a cabinet and being rotatably movable in one direction, a stop member on said cabinet, means on said housing for removably securing a plurality of endless tape cartridges arranged that each of them is inclined to a radius drawn from the center of rotation of said housing and passing through the cartridge, selecting means having members adapted to be moved into a selecting position and corresponding to said plurality of the cartridges and to the number of tracks in a cartridge for selecting a cartridge and a sound track of a tape in a cartridge, said stop member being adapted to engage a movable member in the selecting position to arrest rotation of the housing when the selected cartridge is positioned in a predetermined play position, swingable deck means including a capstan and a magnetic head adapted to abut against a pinch roller and the tape within a cartridge, respectively, end mark sensing means for detecting an end mark on a tape, deck driving means for moving said deck means away from a cartridge in the play position for a predetermined period of time in response to detection of the end mark on the tape, and selecting means returning arrangement coupled to said deck means for moving a selected movable member of said selecting means out of engagement with said stop member in response to movement of said deck means, whereby a plurality of tapes and sound tracks can be played in succession according to a program determined by said selecting means.

2. An automatic playing apparatus utilizing a plurality of endless tape cartridges in accordance with claim 1 wherein said housing is provided with a plurality of openings for receiving the cartridges arranged such that each cartridge is mounted on said housing inclined to a radius drawn from the center of rotation of said housing and passing through said cartridge, the upper and lower walls of said housing being made of a transparent material whereby a label attached to a lid of the cartridge is easily seen through said material to identify recorded matter.

3. An automatic playing apparatus utilizing a plurality of endless tape cartridges in accordance with claim 1 wherein said housing is provided with a plurality of openings for receiving the cartridges being arranged that each of them is inclined to a radius drawn from the center of rotation of said housing and passing through said cartridge, the upper and lower walls of said housing provided with a hole whereby a label attached to a lid of the cartridge is easily seen through said hole to identify recorded matter.

4. An automatic playing apparatus utilizing a plurality of endless tape cartridges in accordance with claim 1 characterized in that said housing is provided with a plurality of openings for receiving the cartridges being arranged that each of them is inclined to a radius drawn from the center of rotation of said housing and passing through said cartridge, said openings being disposed in a manner that the longitudinal direction thereof is not aligned with said radius whereby a label attached to a lid of the cartridge is easily seen to identify recorded matter.

5. The apparatus according to claim 1, wherein said movable members are push rods slidingly mounted in said housing.